July 14, 1925.
A. H. MILLER
1,545,841
ANTIFRICTION BEARING AND METHOD OF ASSEMBLING SAME
Original Filed June 17, 1919
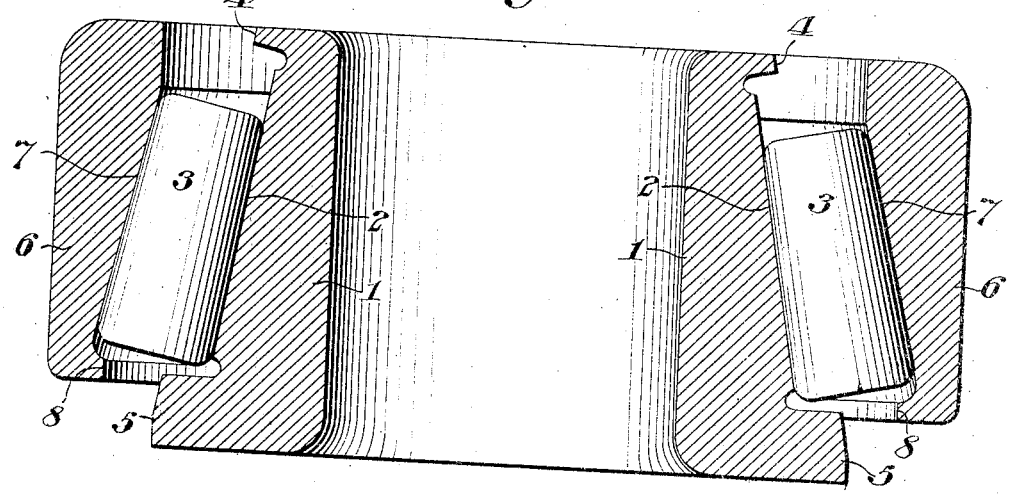
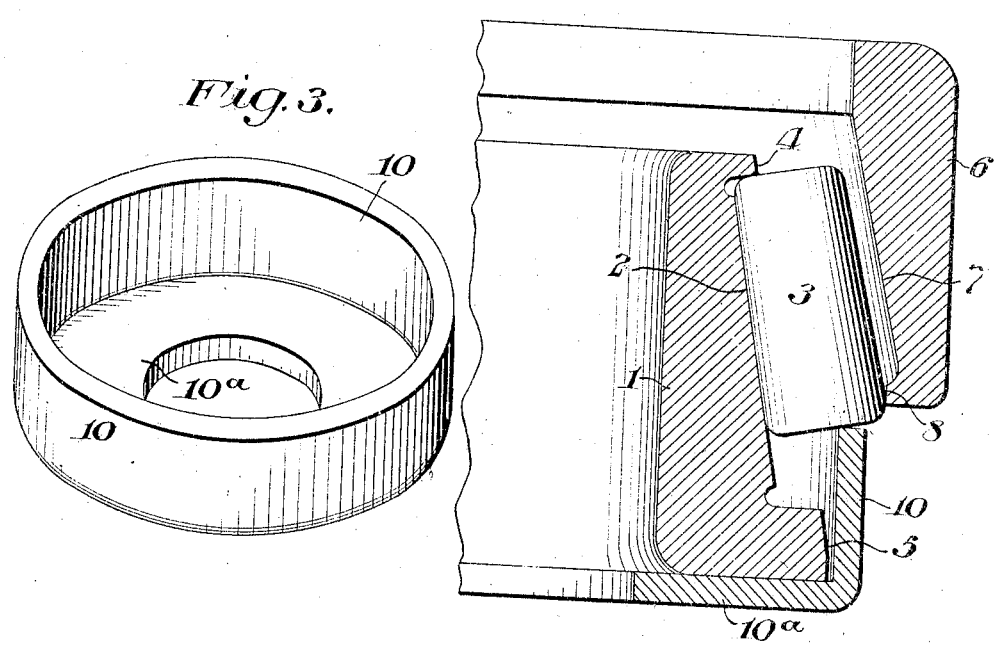
Inventor:
Alfred H. Miller,
By Chester H. Braselton
Attorney.

Patented July 14, 1925.

1,545,841

UNITED STATES PATENT OFFICE.

ALFRED H. MILLER, OF PHILADELPHIA, PENNSYLVANIA, ASSIGNOR, BY MESNE ASSIGNMENTS, TO THE TIMKEN ROLLER BEARING COMPANY, OF CANTON, OHIO, A CORPORATION OF OHIO.

ANTIFRICTION BEARING AND METHOD OF ASSEMBLING SAME.

Application filed June 17, 1919, Serial No. 304,959. Renewed December 5, 1924.

*To all whom it may concern:*

Be it known that I, ALFRED H. MILLER, a citizen of the United States, residing at Philadelphia, Pennsylvania, have invented certain new and useful Improvements in Antifriction Bearings and Methods of Assembling Same; of which I declare the following to be a full, clear, and exact description.

This invention relates to improvements in anti-friction bearings and the method of making same. It relates particularly to anti-friction bearings of the roller type which comprise cone and cup members and rollers interposed between these members and rolling on opposed conical bearing surfaces on said members.

The principal object of my invention is to reduce the cost of manufacture of such bearings by reducing the number of parts and simplifying the assembly of the parts to form a complete bearing unit.

Another object of my invention is to provide a bearing in which all retaining rings or cages are eliminated thus reducing the number of parts and eliminating a certain amount of internal friction. Another object of my invention is to provide an improved method of assembling such anti-friction bearings.

Further objects and objects relating to economies of material and details of construction will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing forming a part of this specification in which:

Figure 1 is a transverse sectional view through a bearing embodying my invention.

Figure 2 is a fragmentary view similar to Figure 1, but showing the bearing in the process of assembling.

Figure 3 is a perspective view of an assembling cup used in assembling the parts of the bearing.

In the drawings, similar reference numerals refer to similar parts throughout the several views.

Referring to the drawings, my improved bearing comprises an inner bearing or cone member 1 having an external conical bearing surface 2 and annular flanges or shoulders 4 and 5 adjacent the ends of said bearing surface and serving to limit the movement of the rollers and to take the thrust from the rollers in case an excessive thrust load is placed on the bearing. The outer bearing or cup member 6 has an internal conical bearing surface 7 and an annular flange or shoulder 8 adjacent one end of said bearing surface. A plurality of tapered rollers 3 are interposed between the bearing surfaces 2 and 7 and roll upon said surfaces under normal conditions of operation.

When the bearing is operating under a radial load, the rollers have a rolling motion on the bearing surfaces 2 and 7 but, as the thrust on the bearing varies under conditions of use, it actually causes a slight axial movement of the rollers on said bearing surfaces and for such purposes the annular shoulders or flanges 4 and 5 are spaced apart a distance substantially greater than the length of the rollers so as to permit a substantial axial movement before the ends of the rollers contact with one of these shoulders. In the construction shown in the drawing this distance is made such as to permit of a substantial axial movement of the rollers for a purpose which will be described hereinafter.

The internal diameter of the flange 8 is slightly greater than the diameter of a circle just touching the outermost parts of the rollers when they occupy the position shown in Figure 2 resting on the bearing surface 2 with their small ends engaging the shoulder 4. The diameter of the flange 8 is less than the diameter of a circle touching the outermost parts of the rollers when they occupy any other position with reference to the bearing surface 2. The result is that if the rollers are temporarily retained in the position shown in Figure 2 with their small ends engaging the shoulder 4 and resting on the surface 2 throughout their length, the outer bearing member or cup 6 may be slipped into place over the rollers because, as has been pointed out above, the internal diameter of the flange 8 is such that it will just clear the outermost parts of the rollers when they are in this position.

In assembling the parts of this bearing I make use of an assembling cup comprising the base 10ᵃ and an upright flange 10. The cone 1 has its base seated on the base 10ᵃ of this assembling cup and the rollers 3 are assembled in position with their small ends engaging shoulder 4 of the cone and their large ends resting on the edge of the flange 10 of the assembling cup. The cup 6 is then slipped over the rollers 3. The assembling cup is then removed and the rollers and cup 6 moved axially with reference to the cone 1 until they occupy the normal position as shown in Figure 1.

The depth of the flanges 4 and 8 is such that these flanges engage each roller 3, if the rollers or bearing members are moved axially of the bearing, on opposite sides of its axis. The result is that if the cup 6 is moved axially, the flange 8 will engage the large ends of the rollers 3 on one side of their respective axes and, if the movement is continued until the small ends of the rollers 3 engage the flange 4, said flange 4 will act as a fulcrum and the rollers will be tipped around said fulcrum so that an axial movement of the cup 6 is ineffective to bring the rollers to the position shown in Figure 2 which is the only position in which the cup 6 can be moved past the rollers to separate the parts of the bearing.

It will be seen that I have not only provided a bearing in which the parts can be very readily assembled at a low cost but that I have also provided a bearing in which the parts can readily be separated when necessary to renew or replace any of the parts. This can readily be done by the use of the assembling cup which will bring the rollers to the position shown in Figure 2 in which position the outer cup member can be removed.

I have shown a bearing in which the rollers are assembled in a certain position relative to the cone member and the cup member moved into position surrounding the rollers but it will be apparent to those skilled in the art that my invention may also be applied by assembling the rollers in a certain position relative to the cup member and moving the cone member into position relative to the rollers and the cup. This involves a change in the position of the flanges but such change will be readily apparent from a consideration of the structure illustrated in the drawings and I consider such a change as falling within the scope of my invention.

I am aware that the particular embodiment of my invention, which I have illustrated and described here, may be varied considerably without departing from the spirit of my invention and, therefore, I desire to claim my invention broadly, as well as specifically, as indicated by the appended claims.

Having thus described my invention, what I claim as new and desire to secure by Letters Patent, is:

1. An anti-friction bearing comprising the combination of a cone and a cup having opposed conical bearing surfaces, a plurality of rollers interposed between and rolling on said surfaces, and an annular shoulder on said cone adjacent the end of said conical bearing surface of smaller diameter so positioned as to permit an axial movement of said rollers relative to said cone sufficient to permit said cup to be freely passed into position over said rollers.

2. An antifriction bearing comprising the combination of a cone and a cup having opposed conical bearing surfaces, a plurality of rollers interposed between and rolling on said surfaces, an annular shoulder on said cone adjacent the end of said conical bearing surface of smaller diameter, said shoulder being so positioned as to permit a substantial axial movement of said rollers relative to said surface, and an annular shoulder on the opposite end of said cup of an internal diameter slightly greater than the diameter of a circle touching the outermost points of said rollers when they rest on said bearing surface with their ends in engagement with the shoulder on said cone.

3. An anti-friction bearing comprising the combination of cone and cup members having opposed conical bearing surfaces, a plurality of rollers interposed between and rolling on said surfaces, an annular shoulder on one of said members limiting axial movement of said rollers, and an annular shoulder on the other member having a diameter such as to just clear the outermost points on said rollers when they rest on the corresponding bearing surface with their ends engaging said first-mentioned shoulder.

4. An anti-friction bearing comprising the combination of cone and cup members having opposed conical bearing surfaces, a plurality of rollers interposed between and rolling on said surfaces, an annular shoulder on one of said members limiting axial movement of said rollers but so positioned as to permit a substantial axial movement thereof, and an annular shoulder on the other member having a diameter such as to just clear the outermost points of said rollers when they rest with their ends engaging the first-mentioned shoulder, on the corresponding bearing surface.

5. An anti-friction bearing comprising the combination of cone and cup members having opposed conical bearing surfaces, a plurality of rollers interposed between and rolling on said surfaces, an annular shoulder on one of said members, limiting axial movement of said rollers, and an annular shoulder on the opposite end of the other member having a diameter such as to just clear the outermost points on said rollers when they rest, with their ends engaging the first-mentioned shoulder, on the corresponding bearing surface, said shoulders being of such depth as to engage the ends of said rollers on opposite sides of their respective axes.

6. An anti-friction bearing comprising the combination of two bearing members and anti-friction elements rolling upon said members and movable transversely of one of said members, the other of said members having a flange of a diameter less than that of a circle tangent to the outermost parts of said elements when they are in their normal operative positions relative to said members and greater than that of another circle tangent to the outermost parts of said elements when they are in other predetermined positions relative to said bearing members.

7. An anti-friction bearing comprising the combination of two bearing members having opposed conical bearing surfaces, a plurality of rollers interposed between and rolling on said surfaces and adapted to have limited axial movements, and an annular retaining flange on one of said members the flange and rollers being so proportioned as to permit of passing the flange-baring member freely over the rollers when these are positioned at one limit of their axial movements relative to the other bearing member, the separation of the bearing members and rollers being impossible in all other positions.

8. An anti-friction bearing comprising the combination of two bearing members having opposed conical bearing surfaces, a plurality of rollers interposed between and rolling on said surfaces, said rollers being permitted a limited axial movement relative to one of said bearing surfaces, and an annular flange on one of said bearing members of such a diameter as to permit the free placing of said bearing member over said rollers when they are positioned at one limit of their axial movements upon the other bearing member, the separation of the bearing members and rollers being impossible in all other positions.

9. An anti-friction bearing comprising the combination of inner and outer bearing members having opposed conical bearing surfaces, a plurality of rollers interposed between and rolling on said surfaces, and an annular flange on the outer bearing member at the base end of its bearing surface, said rollers having a limited axial movement on said inner bearing surface and the internal diameter of said flange being greater than the diameter of a circle drawn tangent to the outermost parts of said rollers when they are in a certain predetermined position on said inner bearing surface and less than the diameter of such a circle when the rollers are in any other position on the inner bearing surface.

10. An anti-friction bearing comprising the combination of two bearing members having opposed conical surfaces, anti-friction elements capable of movement axially of one of said surfaces and also rolling thereon, the other bearing member having a flange defining a circle of a diameter less than that of a circle tangent to the outermost portions of said elements when these are in predetermined positions on said bearing member.

11. An anti-friction bearing comprising the combination of two bearing members having opposed conical bearing surfaces and one of said members at least being provided with a retaining flange, a plurality of conical rollers interposed between and rolling on said surfaces and adapted to have axial movements thereupon, the flange and rollers being proportioned to permit of the free placing of the flange bearing member in an axial direction over the rollers when these are assembled at one limit of their axial movements upon the other bearing member while preventing the separation of said members when the rollers are in other positions.

12. An anti-friction bearing comprising the combination of two bearing members having opposed conical bearing surfaces and at least one retaining flange, a plurality of conical rollers interposed between and rolling on said surfaces, said rollers being free to move across at least one of said bearing surfaces in an axial direction as well as to roll thereon, said flange being of a diameter to permit of the free placing of its bearing member over said rollers in an axial direction when these are assembled at one limit of their axial movements upon the other bearing member while preventing separation of said members when said rollers occupy their operative position.

13. An anti-friction bearing comprising the combination of two bearing members having opposed conical bearing surfaces and at least one retaining flange, a plurality of conical rollers interposed between said bearing surfaces and rolling thereon and free to move across at least one of said surfaces in an axial direction as well as to roll thereon, said flange being of a diameter to permit the free placing of its bearing member over said rollers in an axial direction when these are assembled at one limit of their axial movements upon the other bearing member while preventing the separation of said members when said rollers occupy any other positions.

14. An anti-friction bearing comprising the combination of two bearing members having opposed conical bearing surfaces, the outer bearing having an inwardly extending flange at the large end thereof, a plurality of conical rollers interposed between said surfaces and of a length less than the width of the bearing surface of the inner member, the flange of the outer bearing member defining a circle of less diameter than that of a circle drawn tangent to the outermost portion of the rollers when these are in any but one set of predetermined positions on the inner bearing member and a greater diameter than that of a circle tangent to the outermost portion of said rollers in said predetermined position.

15. An anti-friction bearing comprising the combination of two bearing members having opposed conical bearing surfaces and at least one retaining flange, a plurality of conical rollers interposed between and rolling on said surfaces and adapted to have axial movement on one of said surfaces, the rollers being of such number and diameter as to permit them to be spaced apart under operating conditions, said flange defining a circle of a diameter permitting said outer bearing member to slide freely over said rollers into assembled position without distortion or springing when said rollers are positioned at one limit of their axial movements on one of the bearing members while preventing disassembly of said parts when the rollers occupy any other positions.

16. An anti-friction bearing comprising the combination of two bearing members having opposed conical bearing surfaces and including at least one retaining flange, conical rollers interposed between and rolling on said surfaces and adapted to have axial movement on one of said surfaces, the bearing member having said retaining flange being freely movable over the rollers in an axial direction into assembled position when said rollers are positioned at one limit of their axial movements upon the other bearing member, while being prevented from removal by said rollers when the latter occupy other positions, with means for temporarily retaining the rollers in said predetermined positions.

17. An anti-friction bearing comprising the combination of two bearing members having opposed conical bearing surfaces and including at least one retaining flange, conical rollers interposed between and rolling on said surfaces and adapted to have axial movement on one of said surfaces, the bearing member having said retaining flange being freely movable over the rollers in an axial direction into assembled position when said rollers are positioned at one limit of their axial movements upon the other bearing member, while being prevented from removal by said rollers when the latter occupy other positions, and a ring for temporarily retaining said rollers in said predetermined positions.

18. The method of producing anti-friction bearings comprising the forming of conical bearing surfaces on inner and outer bearing members, assembling and temporarily retaining a plurality of rollers at one limit of their movements in an axial direction relative to one of said bearing members, moving the other bearing member into position engaging said rollers and then moving said bearing member and the rollers axially relative to the first-mentioned bearing member.

19. The method of assembling anti-friction bearings comprising assembling and temporarily retaining a plurality of rollers at one limit of their movements in an axial direction relative to the conical bearing surface of a bearing member, bringing the conical bearing surface of a second bearing member into engagement with said rollers, and moving said second bearing member and rollers axially relative to the first bearing member.

20. The method of producing anti-friction bearings comprising the forming of conical bearing surfaces on inner and outer bearing members, assembling and temporarily retaining a plurality of rollers at one limit of their movements in an axial direction relative to said inner bearing member, moving the outer bearing member into position engaging said rollers and then moving said member and the rollers axially relative to the inner bearing member.

21. The method of assembling anti-friction bearings comprising assembling and temporarily retaining a plurality of rollers at one limit of their movements in an axial direction relative to the conical bearing surfaces of a bearing member, bringing the conical bearing surface of the outer bearing member into engagement with said rollers and moving said outer bearing member and rollers axially relative to the inner bearing member.

In testimony whereof I affix my signature.

ALFRED H. MILLER.